United States Patent [19]

Wasp

[11] 3,719,397
[45] March 6, 1973

[54] CONVEYING A COAL SLURRY WITH A SINGLE PIPELINE

[75] Inventor: Edward J. Wasp, San Rafael, Calif.

[73] Assignee: Bechtel International Corporation, San Francisco, Calif.

[22] Filed: Dec. 20, 1971

[21] Appl. No.: 209,636

[52] U.S. Cl. .................................... 302/66, 302/14
[51] Int. Cl. ............................................. B65g 53/30
[58] Field of Search ...................... 302/66, 14, 15, 16

[56] References Cited

UNITED STATES PATENTS 1,385,447  7/1921  Hamilton ............................... 302/66

*Primary Examiner*—Richard E. Aegerter
*Assistant Examiner*—H. S. Lane
*Attorney*—Carl Hoppe et al.

[57] ABSTRACT

This invention relates to the art of transporting coal with water through a pipeline. More particularly, it relates to a method which includes preparing a vehicle comprising an aqueous slurry of an inorganic finely divided water insoluble solid carrier such as magnetite, coal ash, coal of a selected size or various clays. Coal in particulate form is then suspended in the vehicle. The insoluble solid carrier must be finely divided as compared to the particulate coal to ensure that the two can be separated by screening or hydraulic sizing. In this connection, the solid carrier should all be finer than 100 microns while the particulate coal should all be larger than 500 microns.

After the slurry is formed, it is then pumped through a pipeline to a location many miles away where, after being separated from the vehicle, the coal is utilized and the coal-free vehicle is collected. This operation is continued for a period of several days at the end of which pumping of the slurry is discontinued and the pipeline is flushed with water. Upon completion of the flushing, the coal-free vehicle is pumped back through the pipeline to the point at which the coal slurry is prepared, the vehicle being reused. The water filling the pipeline is returned to the preparation point by the return of the vehicle. In this manner, it is possible to achieve transportation of the coal and reutilization of the vehicle with but a single pipeline.

5 Claims, 2 Drawing Figures

INVENTOR.
Edward J. Wasp

CONVEYING A COAL SLURRY WITH A SINGLE PIPELINE

BACKGROUND OF THE INVENTION

It has been proposed heretofore to transport coal through a pipeline utilizing a vehicle to maintain the coal in suspension as a slurry. In this case, however, the slurry was separated into a coal component and a vehicle component at the point of use of the coal, the vehicle being returned continuously through a separate pipeline. This requires the capital investment in two pipelines.

SUMMARY OF THE INVENTION

It is in general the broad object of the present invention to provide an improved method of transporting coal in suspension in a vehicle from a point of preparation to a point of use whereat the coal is separated for use and the vehicle is collected over a period of time. At the end of the period pumping of the coal slurry is stopped, the pipeline is flushed following which the vehicle is returned through the pipeline to the preparation point for addition of more coal.

BRIEF DESCRIPTION OF THE DRAWINGS

In the drawings,

FIGS. 1 and 2 are schematic flowsheets showing the operation of the present invention, while FIGS. 3 and 4 are fragmentary flowsheets showing variations based on the flowsheet of FIG. 2.

DESCRIPTION OF THE PREFERRED EMBODIMENT

Figure 1:
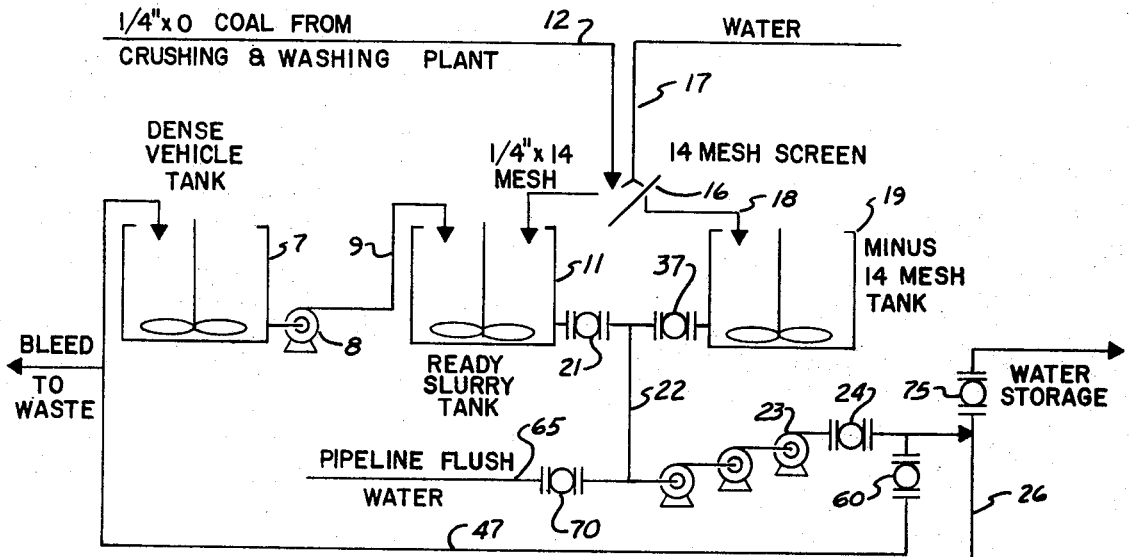
Figure 1:
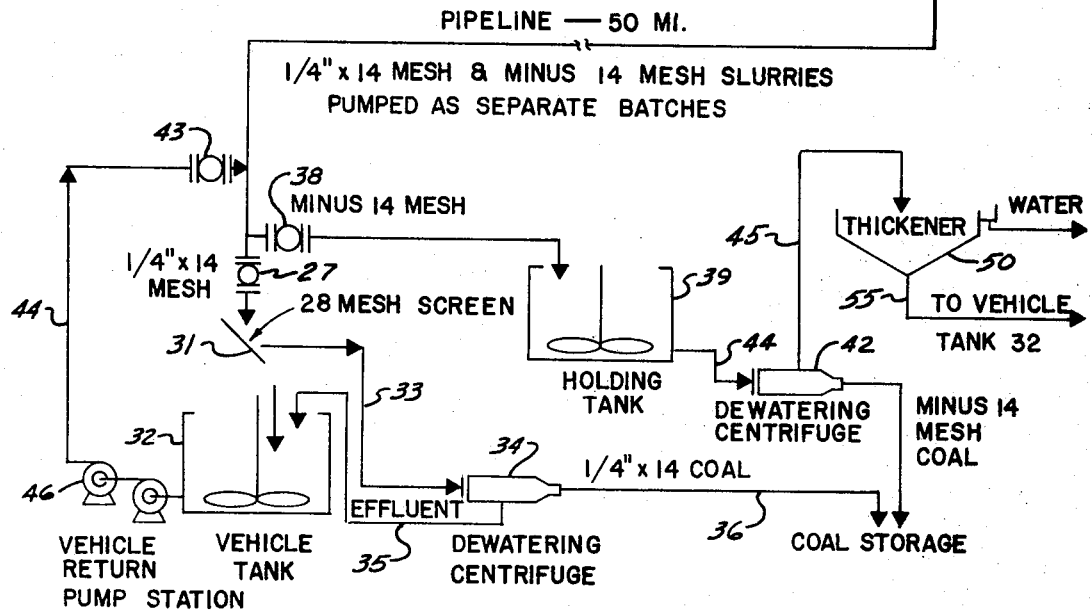

Referring to FIG. 1, a fine dense material in water suspension is fed from tank 7 by pump 8 through line 9 to a slurry tank 11. Coal from a crushing plant is fed through line 12 to screen 16. The screen is sprayed with water from line 17, the coarse coal (usually ¼ inch ×14 mesh) being fed into tank 11 while the fines are passed through line 18 into tank 19 where the minus 14 mesh coal is maintained in slurry form. The coal in suspension in the vehicle in tank 11 is fed through valve 21 to line 22 and then through a series of pumps, generally indicated at 23, and thence through valve 24 into the main pipeline 26. The pipeline is, say, 50 miles in length and extends to a point of use for the coal. The coal in suspension in the vehicle is passed through valve 27 and thence over screen 31 which serves to separate the coal from the vehicle, the latter passing into a vehicle tank 32 where it is collected. The screen size is selected to separate the coal and the vehicle; in one installation a 28 mesh screen was used. The coal from the screen 31 is passed through line 33 into a water separation device 34 such as a centrifuge to remove the water from the coal. The coal is then passed through line 36 to storage. The effluent from the water separation device 34 is sent to the vehicle tank 32 through line 35.

This operation is continued for several days on a definite program, say from Monday through Friday. At the end of this time, valve 21 is closed and valve 37 from tank 19 is open to permit the minus 14 mesh slurry to pass from tank 19 into line 22 for transportation through line 26. When the minus 14 mesh slurry arrives at the point of use, valve 27 is closed and valve 38 is open to permit the minus 14 mesh slurry to pass through a holding tank 39 and thence through line 44 to a water separation device 42 such as a centrifuge which removes the water, the minus 14 mesh coal being sent to storage. The effluent from the dewatering device 42 is sent through line 45 to thickener 50 from which the thickened solids are withdrawn through line 55 to be returned to vehicle tank 32. The flow of fines is continued for, say, half of Saturday.

When transmission of the minus 14 mesh material has been completed, valve 37 is closed and valve 70 is open to permit water to flow into pumps 23 from the pipeline fresh water supply line 65 from water storage tanks (not shown). Transmission of the water is continued until the line 26 is flushed and the water reaches valve 27. When this occurs, valves 24 and 27 are closed and valves 43 and 75 are opened. Pumps 46 are then operated to return the vehicle from the vehicle tank 32 through valve 43 and line 26. The pumping of the vehicle forces the water to return through line 26 and to permit its exit to the water storage tanks (not shown). When the water has been eliminated from line 26, valve 60 is opened and valve 75 is closed and the flow of the vehicle to tank 7 occurs through line 47 for, say, half of Saturday and all of Sunday. The vehicle is returned through line 26 and through line 47 to the vehicle storage tank 7 for reuse in the preparation of additional ¼ inch ×0 mesh coal slurry.

Figure 2:
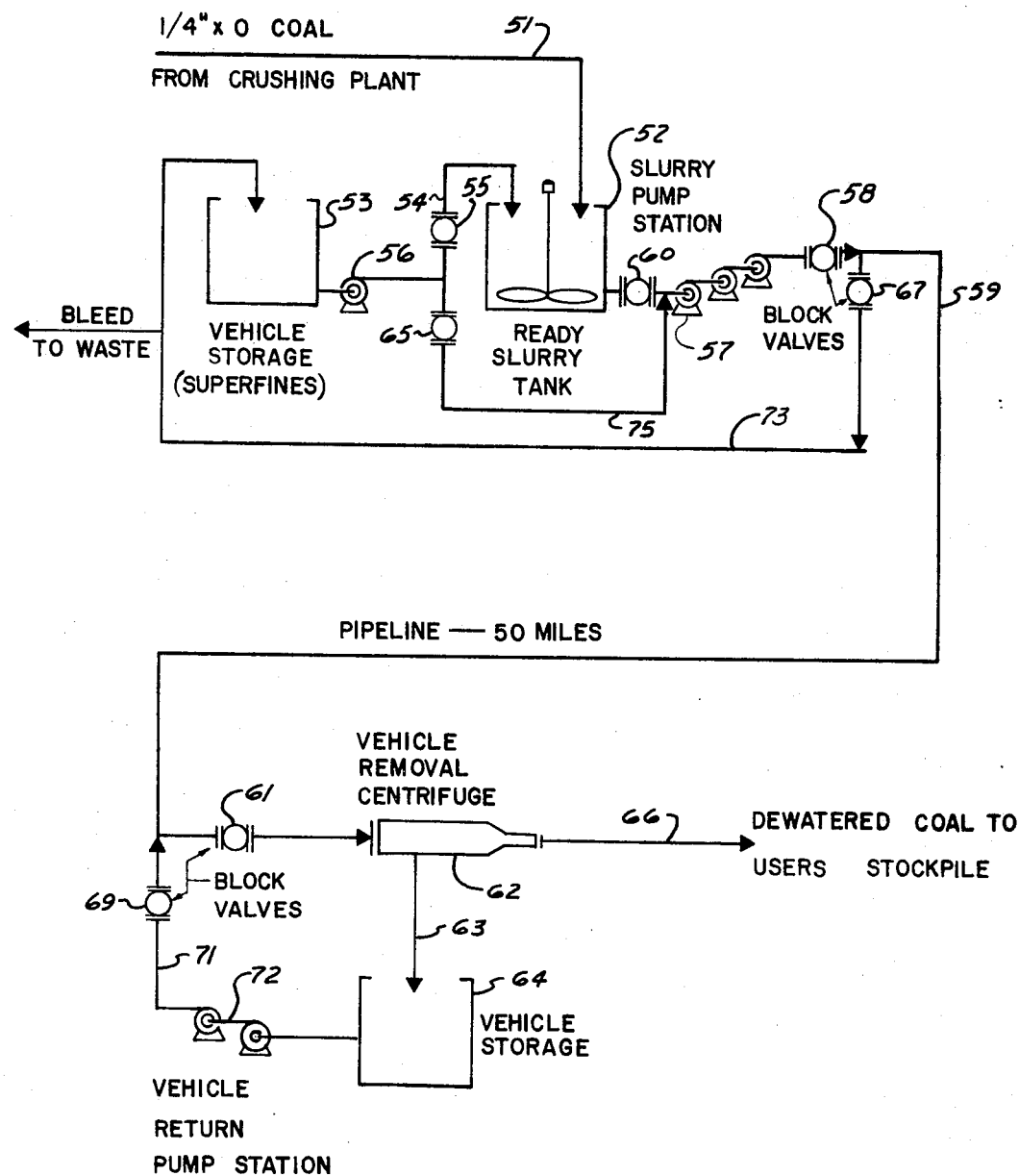

Referring to FIG. 2, coal graded so that it is all finer than ¼ inch is provided from a crushing plant through line 51 to a slurry makeup tank 52. The latter is supplied with a vehicle from tank 53 which is made up of superfine fine coal. Because it is so fine, the solid material provides a very large surface area and it is this which one needs to increase the viscosity of the slurry. The vehicle is passed through line 54 by pump 56 into tank 52 to make up the slurry. The slurry is then passed through a pumping station 57 and through valve 58 into a pipeline 59 which extends to the point of use. There the slurry is passed through the valve 61 to a device 62 such as a centrifuge which serves to separate the coal from the vehicle. The vehicle discharged from the device 62 is removed through line 63 into the storage tank 64 where it is held for several days until the desired amount of dewatered coal has been sent to the user's stockpile through line 66. When this has been achieved, the line 59 is flushed with the vehicle from tank 53, valves 55 and 60 being closed and valve 65 being opened to permit the vehicle to flow through line 75 to pumping station 57. When the line has been flushed free of the coarse coal, valves 58 and 61 are closed and valves 67 and 69 are opened so that the vehicle from tank 64 can be sent through line 71 by pumps 72 from the tank 64. The vehicle flows through line 59 and line 73 to the vehicle tank 53 where it is collected for reuse. b There is an inherent advantage in having a vehicle in which the solid is fine coal. One of the problems with a recycling scheme is the inevitable contamination of the vehicle with minor amounts of coarse coal breaking down and destroying the effectiveness of the vehicle. In FIGS. 3 and 4, I have shown two concepts enabling this difficulty to be eliminated when fine coal provides the solid in the vehicle. Basically each involves the use of a grinding step to reduce the size of the inevitable minor amounts of such coal. This enables one to maintain a vehicle which contains a solid which is finely divided enough to have a high surface area and hence a relatively high viscosity for its concentration. Thus, in FIG. 3 I have shown the effluent from the centrifuge 62 as being discharged through line 63 into a thickener 82. The thickened effluent from the thickener is passed through line 83 and pump 84 through line 86 into a ball mill 87. Depending upon the concentration of the material issuing from the ball mill, water may be added from line 88 to line 89 which leads to the pumps 72.

In the flowsheet shown in FIG. 4, the effluent from the water separation device 62 is passed through line 63 into a liquid cyclone separator 91. The overhead fine product from the cyclone is sent through line 92 into a thickener 93 from which the concentrated fine product is sent through line 94 to line 89 and hence to pump 72. The coarse underflow from the cyclone is sent through line 96 into ball mill 97 and from thence through line 98 to line 89. In this way the coarse coal can be ground to such a size that it provides the necessary high surface area.

I claim:

1. A method of transporting coal from a coal slurry preparation site through a main pipeline to a point of use comprising preparing at such site a slurry of coarse comminuted coal in a vehicle comprising water and a water insoluble solid carrier in finely divided form, pumping said slurry through said pipeline to said point of use whereat the coarse comminuted coal and the vehicle are separated and are separately collected, discontinuing pumping of the slurry through said pipeline, pumping the coarse coal-free vehicle through the pipeline from the point of use of the coal to the slurry preparation site, and storing said vehicle at said site for further transportation of coarse coal.

2. The method of claim 1 wherein the comminuted coal is separated into a coarse fraction and a fines fraction and each fraction is thereafter formed into a separate slurry which is pumped separately through the pipeline to the point of use.

3. The method of claim 2 wherein following pumping of both fractions the pipeline is flushed with water following which the collected coarse coal free vehicle is pumped to the site forcing the water in the pipeline ahead of it.

4. The method of claim 1 wherein the carrier is superfine coal and the slurry is separated at the point of use into a coarse coal fraction free of water and a fines fraction which is ground and thickened to provide a superfine coal fraction which is thereafter returned to the slurry preparation site.

5. The method of claim 1 wherein the carrier is superfine coal and wherein, following pumping of the slurry, the pipeline is flushed with the vehicle until this fills the pipeline whereupon the vehicle is returned to slurry preparation site.

* * * * *